Dec. 19, 1944. C. R. SMITH 2,365,441
HOPPER
Filed Nov. 7, 1942
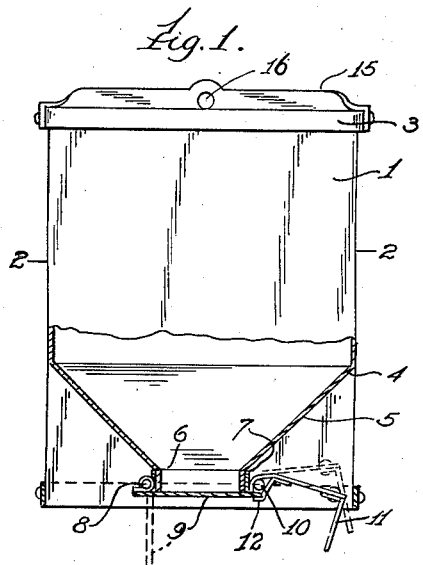
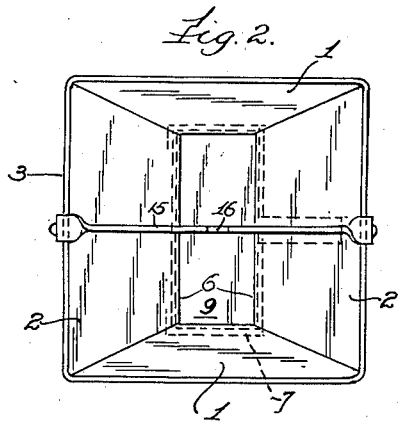
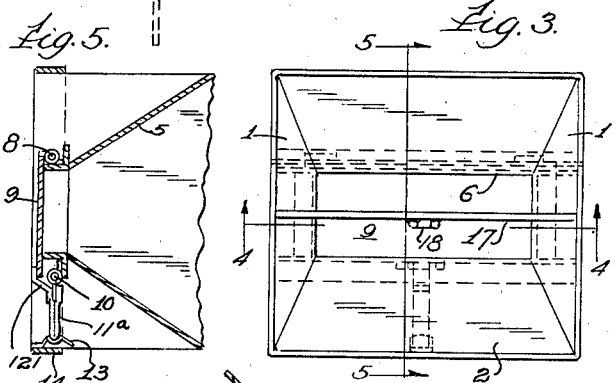
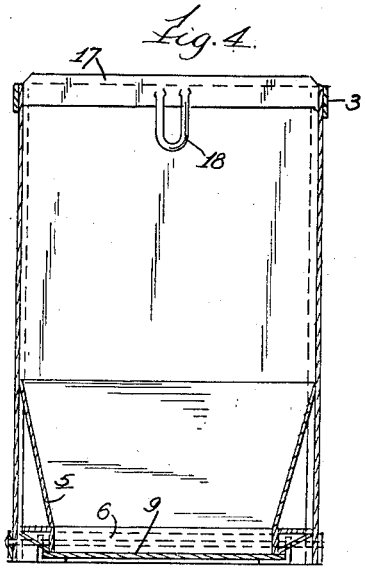
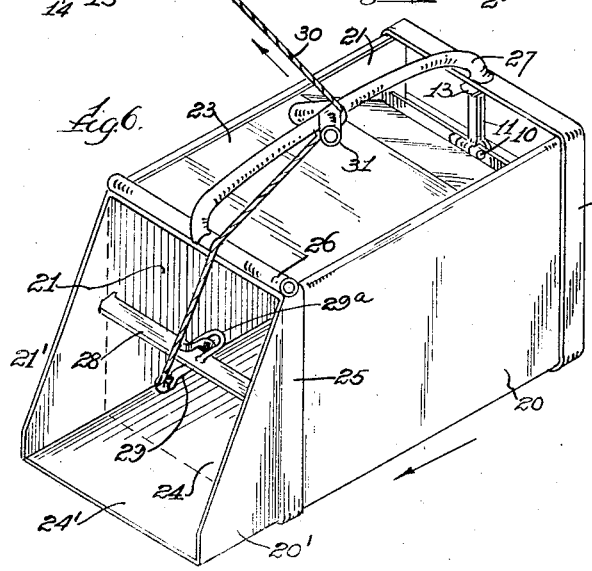
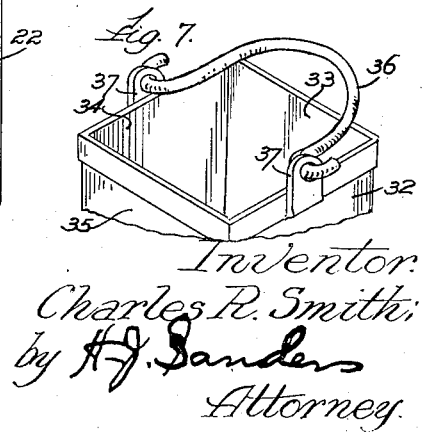
Inventor:
Charles R. Smith,
by H. J. Sanders
Attorney.

// Patented Dec. 19, 1944

2,365,441

UNITED STATES PATENT OFFICE 2,365,441

HOPPER

Charles R. Smith, Chicago, Ill.

Application November 7, 1942, Serial No. 464,913

4 Claims. (Cl. 37—136)

This invention relates to improvements in buckets or hoppers generally used by builders, excavators, roofers, and the like, and more particularly to hoisting hoppers. The present application is a continuation-in-part of my application Serial No. 343,805, filed July 3, 1940, which issued December 15, 1942, as Pat. No. 2,305,202.

One object is to provide a hopper having novel trip means for discharging the load. A further object is to provide a self-loading type of hopper which loads by being drawn through or into the material to be loaded, the power for impelling the hopper into or through the material being provided by the hoisting mechanism used to raise and lower the hopper.

A further object is to provide a hopper designed to carry large or small loads while requiring but little attention or effort on the part of the operator, this being due to the particular structure of the hopper.

With the foregoing and other objects in view the invention consists in the combination and arrangement of parts to be hereinafter fully described, pointed out in the claims and illustrated in the accompanying drawing which forms a part of this patent, and in which—

Fig. 1 is a view in side elevation and partly in vertical section through a hopper constructed according to the present invention.

Fig. 2 is a top plan view of Fig. 1.

Fig. 3 is a top plan view of a slightly modified form of hopper.

Fig. 4 is a vertical sectional view through the hopper of Fig. 3 taken on the line 4—4 thereof.

Fig. 5 is a vertical sectional view through Fig. 3 at right angles to Fig. 4, taken on the line 5—5 of Fig. 3.

Fig. 6 is a view in elevational perspective of a further modified form of hopper of the self-loading type, and, Fig. 7 is a fragmentary view of another type of hopper.

Like reference characters denote corresponding parts throughout.

Referring now to Figs. 1 and 2, the hopper includes the walls 1, 1 opposite each other and the walls 2, 2 opposite each other, the upper ends of said walls forming the mouth being reinforced by a bead 3. The walls 2, 2 are tapered downwardly from a point 4 to form a chute 5 having an oblong discharge end or mouth 6 having reinforcement 7 that carries hingepin 8 for the gravity or drop door 9 that in raised position closes the mouth of the chute, the closed position of said door being shown in full lines and in open position in dotted lines in Fig. 1.

Carried by the reinforcement 7 is the hingepin 10 to which the lever 11 is operatively secured, said lever having a jaw 12 that extends below the forward edge of said door 9 to support the same in closed position, the forward end of said door extending slightly beyond the pin 10, said lever being downturned at substantially a ninety degree angle near its free outer end. In the raised or dotted line position of the lever 11 it has released the door 9 and the same has dropped through gravity or the weight of the load into open position discharging the load. The lever is adapted to be readily raised by the operator manually when it is desired to discharge the load.

The free end of the lever always extends beyond the lower end of the hopper and in normal door-engaging position, as shown in full lines in Fig. 1, when coming in contact with an object as when the hopper is lowered upon a roof or other surface will through contact with same be moved into disengaged dotted line position thus permitting the door 9 to drop through gravity or the weight of the load into open position discharging the load. Normally the weight of the load or even the weight of the door 9 will keep the lever 11 releasably in full line door-engaging position. The hopper is provided with a handle 15 having a perforation 16 therein to receive a hook to permit raising or lowering.

Referring now to Figs. 3 to 5 inclusive the hopper includes the walls 1, 1 and 2, 2, the upper ends of said walls forming the mouth having bead 3. The walls 2, 2 are tapered downwardly to form a chute 5 having a discharge end 6 carrying hingepin 8 for the gravity door 9 that in raised position closes the mouth of the chute, the closed position of said door being shown in Figs. 4 and 5, its open position being similar to that shown in dotted lines in Fig. 1.

Carried by the discharge end of the chute is the hingepin 10 to which a lever 11a is secured, said lever having a jaw 121 that extends below the forward edge of said door 9 to support the same in closed position, the forward end of said door extending slightly beyond the pin 10, the forward end of said lever being normally supported in a bent portion or seat formed in a stout spring 13 secured to a reinforcing band 14 at the lower end of the walls 1, 1. In this type of lever the same will not release as the hopper is disposed upon the ground but is intended only for manual operation by the operator pushing upwardly upon the lever 11a to disengage same from the spring. This hopper is provided with a handle 17 having a depending hook 18 to permit raising or lowering.

Referring now to Fig. 6 the hopper includes a pair of straight side walls 20, 21 connected at their lower ends by a reinforcing band 22, and side walls 23, 24 tapered at their lower portions to form a chute exactly like the chute 5 in the preceding figures. The walls 20, 21, 24 are extended to form a scoop having the sides 20', 21', 24', the topmost ends of said walls being connected by a reinforcing band 25 which band is strengthened across the face 23 by a tubular reinforcement 26.

The reinforcement 26 is connected to the reinforcing band 22 by the handle 27 extending longitudinally of the wall 23 but in spaced relation thereto. A draft bar 28 spanning the mouth of the chute and of the scoop is provided with a depending loop 29a through which the hook 29 extends for engagement with the draft bar, said hook 29 being secured to one end of the cable 30 that runs to the power unit or hoist (not shown), said cable being adapted to releasably engage the cuneate head 31 formed upon or secured to the handle 27 intermediate its ends, the apex of said head being directed toward the lower end of the hopper.

The hopper formed by the several walls and including the chute having the tapered walls 23, 24 is in most respects like the hopper previously described, the chute being identical with the chute 5 and being provided with a door and manually releasable latch or lever therefor the same as lever or latch 11 normally engaged by a like spring 13. To fill the hopper automatically it is disposed upon its side wall 24 and scoop wall 24' as shown, with the hook 29 passing through the depending loop 29a and engaging the draft bar 28, said cable 30 passing about the left wing or side of the head 31, this wing being the left wing to the operator who stands adjacent the side wall 20 or immediately in back of the hopper, with four fingers of his right hand engaging the handle 27 and his thumb gently pressing upon the cable 30 to prevent it from slipping free of the head 31. By means of the handle 27 the operator so inclines or directs the hopper that a pull upon the cable 30 will hold it against the head 31 and handle 27 at their junction and this pull will impel the hopper, scoop-end foremost, into the material to be loaded which will pass through the scoop into the hopper body filling the same. When filled the operator removes his thumb from the cable and maneuvers the hopper to permit the cable to leave the head 31, the cable then raising the scoop end of the hopper to upright position and thereafter raising the hopper to the elevation desired.

But the slightest change in direction of the hopper by means of its handle 27 will disengage the cable from the head 31. The hopper load is discharged manually as previously described with relation to the hopper 5. Referring now to Fig. 7 the mouth of the hopper formed by the walls 32, 33, 34, 35 is provided with a handle 36 having its ends secured to ears 37 secured to the walls 32, 34.

What is claimed is:

1. A hopper having an open forward end, a draft bar in said end, a handle connecting the ends of the hopper, a cuneate head carried by said handle with its narrow end disposed rearwardly, and a cable connected to said draft bar for passage over the narrow end of said head.

2. A hopper having a scoop-shaped end, a draft bar in said end, a handle extending from said end rearwardly, a cuneate head carried by said handle, and a cable connected to said draft bar for passage about said head and over said handle, the hopper being maneuverable by means of said handle to cause disengagement of said cable from said head.

3. In a hopper having an open forward end, a draft bar in said end, a loop carried by said draft bar, a handle connecting the ends of said hopper, an angular head carried by said handle with a narrow end disposed rearwardly, a hook extending through said loop engaging said draft bar, and a cable connected to said hook for passage about said head and over said handle for moving the hopper forwardly upon the ground, the hopper being maneuverable by means of said handle to cause disengagement of said cable from said head to dispose the hopper upright and raise same.

4. In a hopper having an open forward end, a draft bar in said end, a loop carried by said draft bar, an axially disposed hopper handle, an angular head carried by said handle, a hook extending through said loop engaging said draft bar, and a cable connected to said hook for passage about said head and handle for moving the hopper upon the ground, the hopper being maneuverable by means of said handle as a guide and to cause disengagement of said cable from said head to dispose the hopper in a second operative position and for lifting same.

CHARLES R. SMITH.